Feb. 9, 1926. 1,572,236
C. W. FREDERICK
CAMERA OBSCURA
Filed March 26, 1924    3 Sheets-Sheet 1
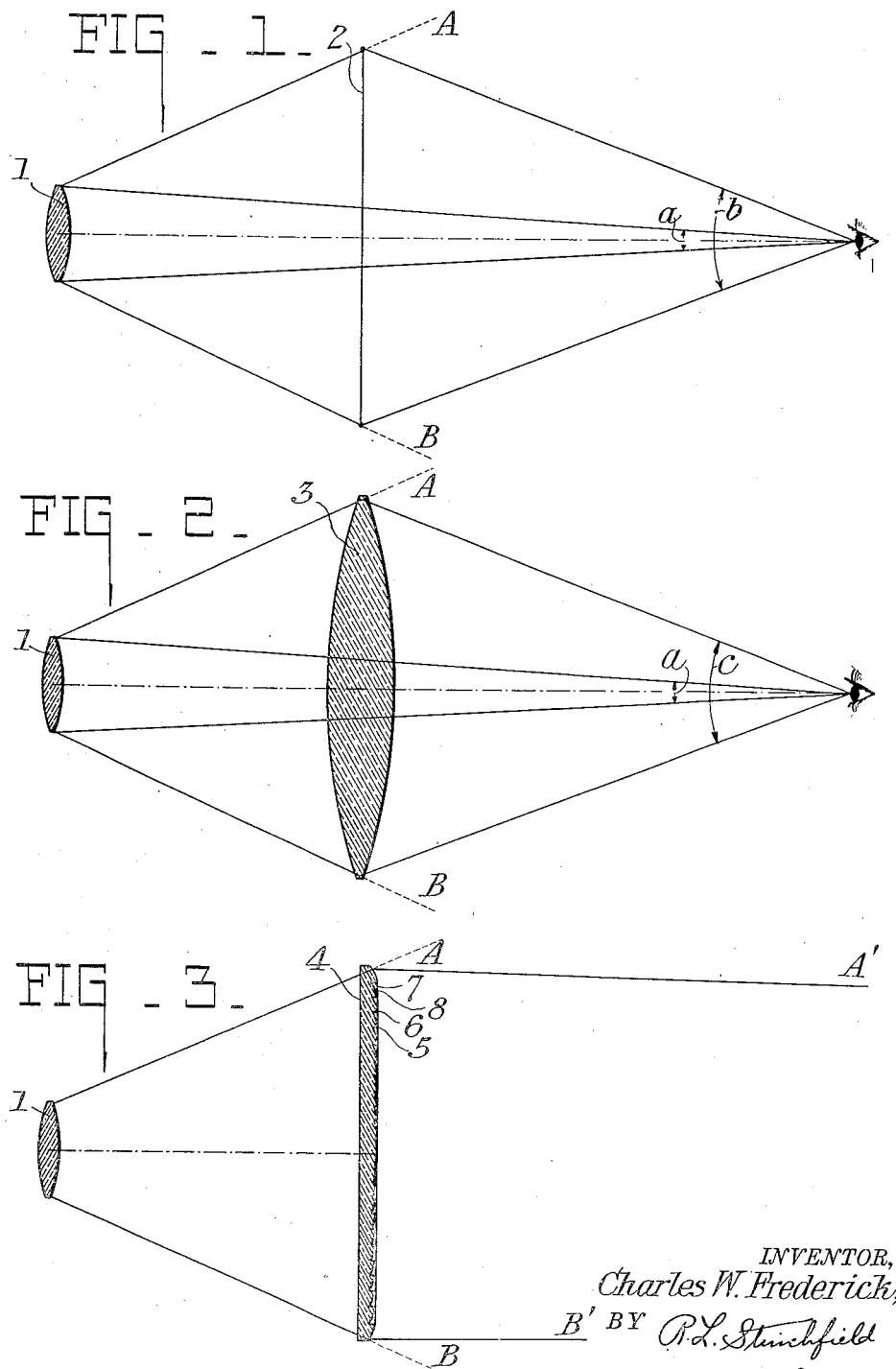
INVENTOR,
Charles W. Frederick,
BY
ATTORNEYS.

Feb. 9, 1926.
C. W. FREDERICK
CAMERA OBSCURA
Filed March 26, 1924    3 Sheets-Sheet 2
1,572,236
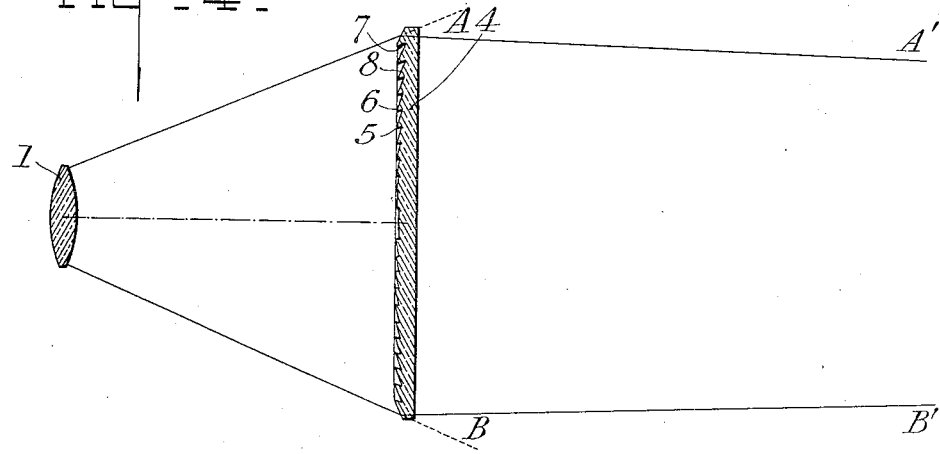
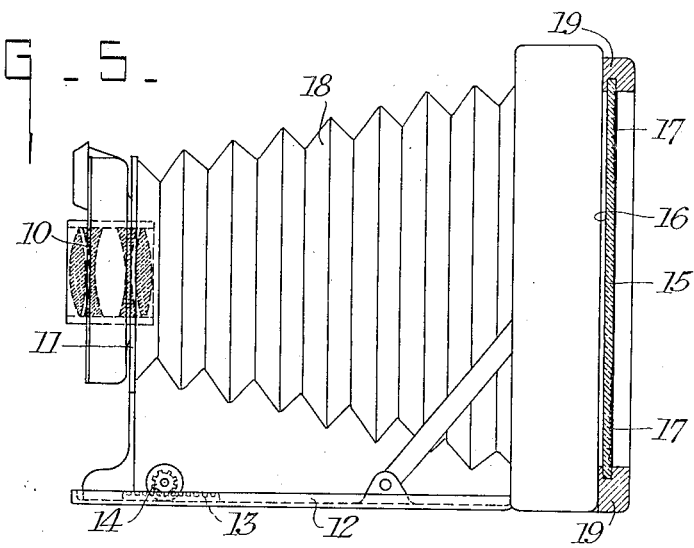
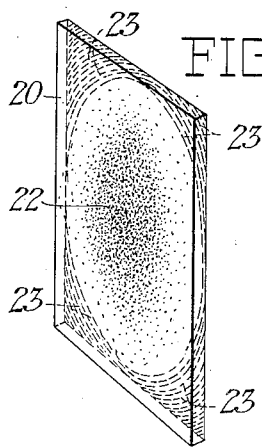
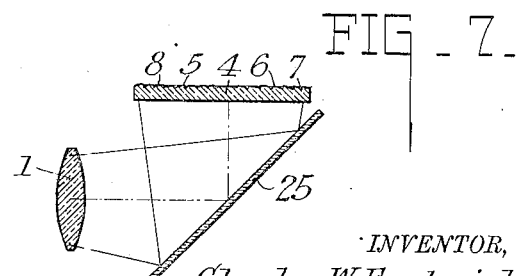
INVENTOR,
Charles W. Frederick,
BY
R. L. Stinchfield
N. M. Perrins
ATTORNEYS.

Feb. 9, 1926.
C. W. FREDERICK
CAMERA OBSCURA
Filed March 26, 1924
1,572,236
3 Sheets-Sheet 3
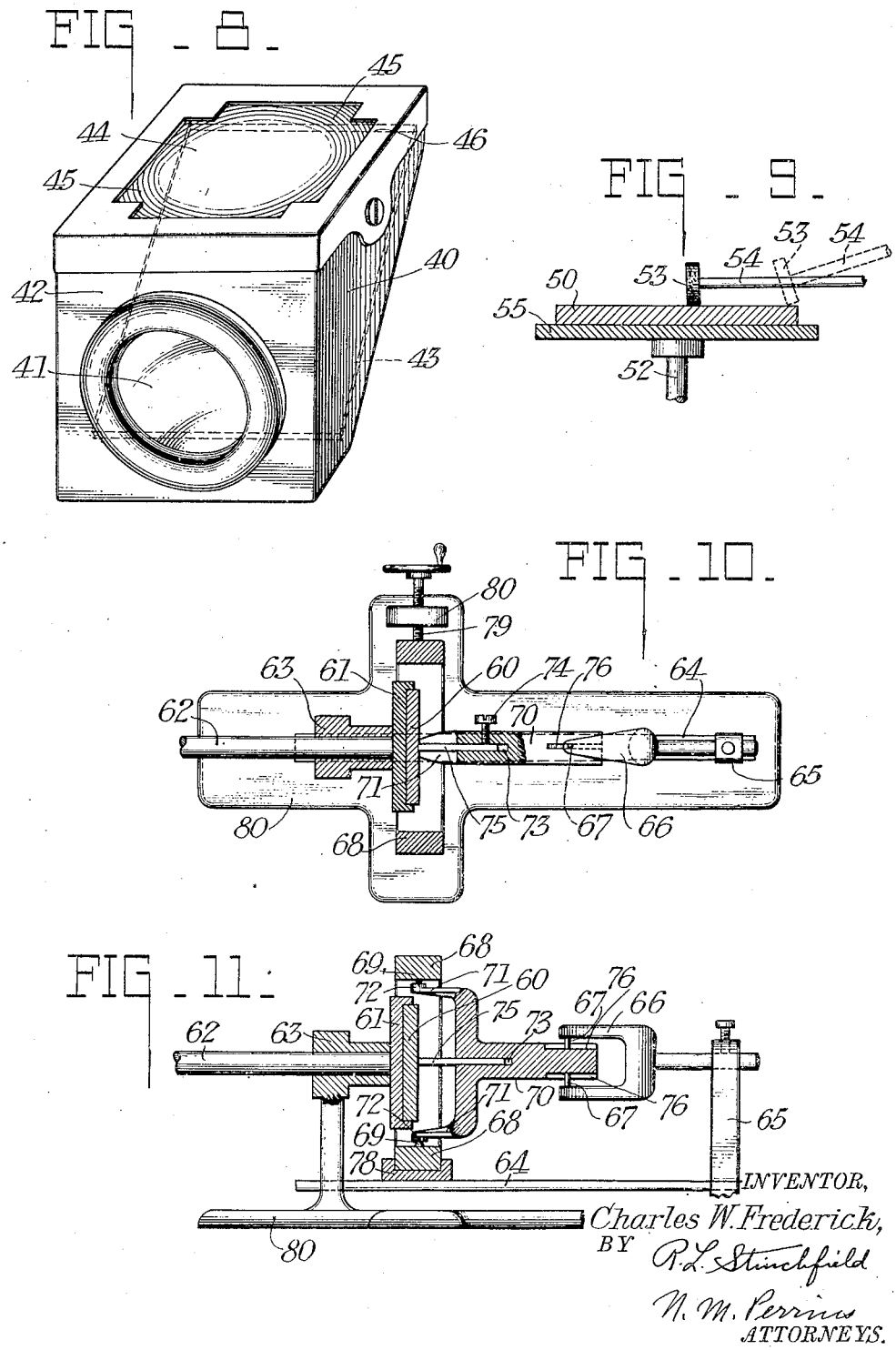

Patented Feb. 9, 1926.

1,572,236

UNITED STATES PATENT OFFICE.

CHARLES W. FREDERICK, OF ROCHESTER, NEW YORK, ASSIGNOR TO EASTMAN KODAK COMPANY, OF ROCHESTER, NEW YORK, A CORPORATION OF NEW YORK.

CAMERA OBSCURA.

Application filed March 26, 1924. Serial No. 702,127.

*To all whom it may concern:*

Be it known that I, CHARLES W. FREDERICK, a citizen of the United States of America, residing at Rochester, in the county of Monroe and State of New York, have invented certain new and useful Improvements in Cameras Obscura, of which the following is a full, clear, and exact specification.

This invention relates to cameras obscura, and more particularly to optical improvements therein designed to increase the brilliancy of the observed image. A camera obscura comprises an objective and a visual screen upon which the objective focuses an image of a scene or object, and by which it is rendered visible. My invention is applicable to such a screen of the light transmitting type and comprises the formation in the rear surface thereof of ridges or prisms which tend to direct the rays more nearly parallel to the axis or more convergent and render the apparent brightness of the image much greater.

The invention is particularly applicable to photographic apparatus and more especially to a certain type of finders, or to cameras when used with ground glasses in place for focussing, both of which types of apparatus are particular forms or adaptations of a camera obscura.

Reference will now be made to the accompanying drawings in which like reference characters designate like parts and in which—

Figs. 1 and 2 are diagrams used to illustrate certain optical principles,

Figs. 3 and 4 are diagrams illustrating two embodiments of my invention.

Fig. 5 illustrates one form of my invention as applied to a camera,

Fig. 6 illustrates one form of screen useful in my improved system,

Fig. 7 is a diagram of another optical system embodying my invention,

Fig. 8 is a perspective view of a reflecting finder embodying my invention,

Fig. 9 is a diagram illustrating mechanism useful in making a die from which one surface of a screen forming part of my improved optical system may be formed.

Figs. 10 and 11 are, respectively, a plan and a side elevation partly in section, of another mechanism for making a die.

If an object at some distance is viewed through a positive lens or objective held at a distance from the eye considerably greater than its focal length, an inverted image of the object will be perceived and the angle of view perceived will be rather small, being limited by the angular width of the lens as viewed from the eye and designated $a$ in Fig. 1. The other rays included in the beam between lines A and B, transmitted through the lens will be lost. In order to render apparent to the eye the entire field covered by the lens, it is necessary to interpose either a screen upon which the lens projects an image which may be viewed or a collecter, that is so placed as to intercept a wider angle of rays from the objectives and refract them in a beam that is convergent toward the eye. The first expedient is shown in Fig. 1 where the image from the lens 1 is focussed on a screen 2, and may be viewed by the eye E, the limiting rays subtending the wider angle $b$. In order to make this possible the screen must be light diffusing and is ordinarily of ground glass. The screen 2 diffuses the light and the rays are scattered in all directions so that while the observer sees an image over the entire screen, it is not a brilliantly illuminated one. A transparent screen would merely permit the rays to pass.

The second expedient is shown in Fig. 2 where a collecting lens 3 is shown as intercepting the cone of light between lines A and B from the lens 1 and refracting the rays so that the eye can perceive them through the angle $c$. The image thus seen covers a much wider angle than the image as seen by looking directly at the lens 1.

The system shown in Fig. 1 is that utilized in focussing cameras by means of a ground glass and in some camera finders, and the system shown in Fig. 2 is that known as a periscopic system and used in "brilliant finders". In such finders the lenses are usually of about the same size and the rear lens should be separated by a distance approximating the focal length of the front lens. The image should preferably be formed at or near the back surface of the rear lens.

In one embodiment of my invention, shown in Fig. 3, I place at the focal plane of the lens 1 a sheet 4 preferably of glass having one surface plane and the other formed with prismatic corrugations 5 formed preferably in circles concentric with the axis. These corrugations or ridges are formed with their tips 6 in the same plane, the grooves between adjacent tips each having a steep outer wall 7 and an inclined inner wall 8. The inclination of the wall 8 determines the prismatic angle of that particular portion, and the amount of refraction of the rays from the lens. The inclination of this wall 8 in the inner grooves is very slight and the grooves are shallow but the inclination and the depth becomes greater as the grooves are more remote from the center. The successive refractive surfaces constitute in reality a series of zones functioning as a whole like a positive lens, and rendering the rays which would otherwise pass, for instance, between the lines A and B, convergent or more nearly parallel to the axis, as within the concentrated beam between lines A' and B'. The degree of correction can be controlled by the angles of the surfaces 8. This form, in which the plane surface is smooth, is particularly adapted for a "brilliant finder". If desired the prismatic grooves or ridges may be formed on the surface nearer the lens, as shown in Fig. 4.

For use in a focussing camera, the plane surface of the screen may be ground and faced toward the lens. Such an arrangement is shown diagrammatically in Fig. 5, in which the lens 10 is mounted on a lens board 11, adjustable on the bed 12 by means of the rack 13 and pinion 14. The screen 15 has its front surface 16 ground and prismatic corrugations 17 on its rear surface. Suitable bellows 18 connect the lens board 11 and focussing screen holder 19. The prismatic corrugations then direct toward the observer many of the rays proceeding in all directions from the diffusing surface and render the image brighter. A particularly desirable embodiment for this purpose, as shown in Fig. 6, embodies a glass plate 20 with one surface plane and ground differentially at 22, being most diffusing at the center and smooth at the extreme corners, while the grooves 23 are formed only at the corners on the other surface, thus increasing the brightness at the corners where the illumination is frequently poorest. Focussing is then done in the center of the screen, while the whole field is well lighted for composing the picture.

The camera or finder may be of the reflecting type and this system is shown diagrammatically in Fig. 7 where the optical elements are the same as in Fig. 3, the same characters being used, with the addition of mirror 25.

Fig. 8 illustrates a finder as manufactured and embodying this system. It comprises a casing 40 of familiar type with a lens 41 mounted in the front wall 42, an inclined mirror 43 and a rear ground glass screen 44, the upper surface of which has prismatic corrugations 45, here shown as at the edges only. A suitable mask 46 is used.

It is to be understood that for the sake of clearness of illustration the ridges or corrugations are shown on a much magnified scale. In practice they will be of the same order of size as the line screens used in photoengraving processes. I find from 100 to 250 ridges to an inch to give useful results.

The ridges are most conveniently made by grinding, pressing or molding. In making up finder lenses in which a high degree of precision is not required, the heated glass may be submitted to pressure between two suitably shaped metal dies or the molten glass may be poured into molds. The die having the corrugations may be formed as follows, reference being made to Fig. 9. A plate or die 50 carried on a support 55 rotates about its axis 52. A grinding disc 53, carried on a rotating shaft 54, grinds the grooves into the surface 51. When grinding the inner grooves the grinding disc is held in the position shown in full lines so as to make a groove with a slightly inclined wall; but the inclination is increased as the outer grooves are made, the tool taking the position shown in dotted lines. A series of separate concentric grooves may be made, or the tool may be moved continuously, making a spiral, the convolutions of which are so fine, that the curve is substantially concentric with the axis and the prismatic convolutions resulting give satisfactory results. The details of the mechanism for controlling the movement of the shaft 54 are not necessary for an understanding of the invention herein described.

Another apparatus for making the die is shown in Figs. 10 and 11. A plate or die 60 is carried on a support 61 rotated upon a shaft 62, supported in bearing 63. The base 80 for the bearing 67, also carries a support 65 for a U shaped member 66 having vertically aligned fixed trunnions 67. A rectangular frame 68 is mounted parallel to the plate 60 and carries vertically aligned fixed trunnions 69 on its upper and lower cross bars. Trunnions 67 are in line with the axis of shaft 62. A tool holder 70 has at one end arms 71 with bearings 72 for engagement with trunnions 69 and a recess 73 with a clamping screw 74 for holding a tool 75 between the arms. On the upper and lower surfaces at the other end of the tool holder are longitudinal slots 76 for engaging trunnion 67. The axis of rotation of the bearings 72 passes through the face of the tool 75 and is in the plane of the front face of plate 60. When the tool holder and tool are in alignment with shaft 62 the tool lies against the plate and does not cut it when the plate is rotated. Frame 68 is adjustable, transversely of shaft 62 in supporting groove E 78, carried by frame 64 suitably supported from the base 80, by any means such as the screw 79, operating through bracket 80. As the frame is moved the tool holder will turn on trunnion 72 and will turn and slide on trunnions 67. The tool 75 will be inclined so that its face instead of lying against the plate 60 will be inclined. If the movement takes place gradually while the shaft 62 is turning, the cutting edge of the tool will be turned further and further, cutting a groove of increasing pitch into the face of the plate 60. Either a continuous spiral groove or a series of truly concentric circular grooves may be cut. But as the grooves are very narrow, the pitch of the spiral is so slight that it is effective as a circle concentric with the axis.

The metallic die made by either of the above mechanism is used to press hot glass, or to mold molten glass into the desired shape.

It will be seen that in all the forms of my invention described there is a front lens, by which term I include a corrected or uncorrected objective, and a light transmitting rear element which by reason of the prismatic corrugations thereon renders the image from the front lens brighter and more completely visible to the observer. It is obvious that numerous other embodiments of my invention are possible and I contemplate as within the scope of my invention all such modifications and equivalents as fall within the terms of my claims.

Having thus described my invention, what I claim as new and desire to secure by Letters Patent is:

1. An optical system constituting a camera obscura and comprising a front lens and a rear light transmitting element spaced therefrom, the lens being adapted to focus an image at a surface of said rear element, the rear element having on one surface a series of prismatic corrugations having a convergent effect upon the light beam transmitted through the system.

2. An optical system constituting a camera obscura and comprising a front lens and a rear light transmitting element, spaced therefrom by a distance approximating the focal length of the lens and having on one surface a series of concentric prismatic ridges having a convergent effect upon the light beam transmitted through them.

3. An optical system comprising a front positive lens and a rear light transmitting element spaced therefrom, the rear element having on one surface a series of concentric prismatic corrugations having a convergent effect upon the light transmitted through them, and the front lens being adapted to form a real image of a distant object in the region of the rear element.

4. An optical system constituting a camera obscura and comprising a front lens and a rear light transmitting screen the surface of the screen facing the objective being plane and light diffusing and the other surface having formed therein a series of prismatic corrugations having a convergent effect upon the light beam transmitted through them.

5. An optical system comprising a positive front lens and a rear light transmitting element spaced therefrom by a distance approximating the focal length of the front lens and having on one of its surfaces a series of minute prismatic corrugations concentric with the optical axis of the system and having a convergent effect upon the light beam transmitted through the system.

6. An optical system comprising a positive front lens and a rear light transmitting element spaced therefrom by a distance approximating the focal length of the front lens and having on one of its surfaces a series of minute prismatic corrugations concentric with the optical axis of the system and having a convergent effect upon the light beam transmitted through the system, the outer corrugations having greater refracting power than the inner ones.

7. An optical system comprising a positive front lens and a rear light transmitting element spaced therefrom by a distance approximating the focal length of the front lens and having on one of its surfaces a series of minute prismatic corrugations concentric with the optical axis of the system and having a convergent effect upon the light beam transmitted through the system, the refractive effect of the series of corrugations increasing outwardly from the center.

8. An optical element comprising a sheet of light transmitting and diffusing material, one surface of which is plane and the other surface of which has minute concentric prismatic corrugations.

9. An optical element comprising a sheet of light transmitting material, one surface of which is plane and light diffusing and the other surface of which has minute concentric prismatic corrugations.

10. An optical element comprising a sheet of light transmitting and diffusing material, one surface of which is plane and the other surface of which has minute concentric prismatic corrugations, the peaks of which lie in a plane.

11. An optical element comprising a sheet of light transmitting and diffusing material, one surface of which is plane and the other surface of which has minute concentric prismatic corrugations, the refractive effect of the series of corrugations increasing outwardly from the center of the element.

Signed at Rochester, New York, this 21st day of March, 1924.

CHARLES W. FREDERICK.